United States Patent [19]
Harvey et al.

[11] Patent Number: 6,052,584
[45] Date of Patent: Apr. 18, 2000

[54] CDMA CELLULAR SYSTEM TESTING, ANALYSIS AND OPTIMIZATION

[75] Inventors: Richard L. Harvey, Neshanic Station; Roman Z. Zaputowycz, Hillsdale, both of N.J.

[73] Assignee: Bell Atlantic Nynex Mobile, Bedminster, N.J.

[21] Appl. No.: 08/900,011

[22] Filed: Jul. 24, 1997

[51] Int. Cl.[7] .................................................. H04Q 7/34
[52] U.S. Cl. .................. 455/423; 455/67.1; 455/67.4; 370/241; 370/335
[58] Field of Search .................................. 455/423, 424, 455/425, 507, 67.1, 67.2, 67.3, 67.4, 9, 446; 370/335, 342, 241, 242; 375/213, 224

[56] References Cited

U.S. PATENT DOCUMENTS

| | | | |
|---|---|---|---|
| 5,095,500 | 3/1992 | Tayloe et al. | 455/424 |
| 5,425,076 | 6/1995 | Knippelmier | 455/424 |
| 5,465,390 | 11/1995 | Cohen | 455/423 |
| 5,481,588 | 1/1996 | Rickli et al. | 455/67.1 |
| 5,596,570 | 1/1997 | Soliman | 370/252 |

*Primary Examiner*—Lee Nguyen
*Attorney, Agent, or Firm*—McDermott, Will & Emery

[57] ABSTRACT

Testing a CDMA cellular communication system involves placing stationary load box test units about a selected cell and transmitting predetermined signals from the test units. The signals include voice signals or audio test sequences, such that the transmissions simulate traffic loading in the cell. The effective radiated power from the stationary test units is varied in a predetermined manner to simulate fading, multi-path, and motion. A mobile test unit traverses the cell along a predetermined path. The mobile test unit makes, a CDMA telephone call to at least one of the stationary test units during transit. The mobile test unit includes a data recorder, which records test data regarding the call(s), including a recording of the voice or specialized audio test sequences. One or more of the stationary test units that receives a call from the mobile unlit also records pertinent data regarding the test call.

35 Claims, 2 Drawing Sheets

CDMA CELLULAR SYSTEM TESTING, ANALYSIS AND OPTIMIZATION

FIELD OF THE INVENTION

The present invention relates to the analysis, testing, and optimization of CDMA (Code Division Multiple Access) cellular communication systems. More particularly the invention relates to a system and technique for rapidly testing and analyzing the operation of a CDMA cellular system using emulation of system operation under load

BACKGROUND

Spread spectrum Code Division Multiple Access (CDMA) systems are characterized by transmission of information over a radio frequency bandwidth much larger than that normally used in narrowband radio systems. This is achieved using a pseudorandom sequence to effect the RF-spreading which is shared by the transmitter and receiver, and the use of unique orthogonal random sequences to differentiate between users sharing the same RF-channel bandwidth. Specifically, CDMA is one of the technologies being used in the United States for the 800 MHz cellular bands and the 1900 MHz PCS bands. It differs from analog cellular and D-AMPS/GSM systems in the respect that users are differentiated from each other by the unique code (i.e. orthogonal code) rather than frequency assignment as in AMPS, or frequency and time slot assignment as in GSM and D-AMPS.

The CDMA systems are standardized according to TIA/EIA/IS-95(Mobile Station-Base Station Compatibility Standard for Dual Mode Wideband Spread Spectrum Cellular System-1992 or its latest revision). In the IS-95 version of CDMA, each signal is a different and mutualy orthogonal pseudorandom binary sequence that modulates the carrier and spreads the spectrum of the carrier frequency. Operation of an IS-95 CDMA cellular system can be characterized by the interrelationship among three variables.

The variables are Quality, Capacity and Range (QCR). These three variables can be optimized individually. However, if this is done then the other two variables would likely be unsatisfactory. The CDMA system must be operated such that all three variables are set in a manner to provide sufficient capacity, good quality and adequate coverage i.e. range. The overall performance of all three variables is also dependent on the protocol/modulation scheme which is used and, the specific implementation of the software and hardware of the mobile unit and cellular system. The former has already been standardized and cannot be changed; the latter is the focus of the testing, analysis, and optimization system and technique of the present invention.

The foregoing inter-relationship between the three variables can be expressed as follows:

$$A*Q+b*C+c*R=K$$

Where a, b, c are constants

Q=a Quality Measurement (ex. 1=MOS 1; MOS=Mean Opinion Score)

C=a Capacity Measurement (ex. 1=Analog Capacity)

R=Range in Meters

K is a constant for a particular implementation which may change depending on which hardware and software is used.

From this mathematical expression it can be seen that in CDMA the previously indicated variables can be utilized to either adjust the system or capacity or increase the range at a reduced capacity (i.e. number of users), or to increase capacity over reduced range. Alternatively, it is possible to reduce quality and increase range or capacity or possibly both, due to the multivariate system behavior. To summarize, the deployment of an IS-95 CDMA Cellular System requires that many software/hardware elements of the system mesh and operate well together. Consequently, in order to obtain the required quality, capacity and range (QCR), all of the following functions must also be operating up to some minimum performance level:

> Mobile and Cell Power Control
> Inter-Face Soft Handoff
> Inter-Cell Soft Handoff
> Inter-System Soft Handoff To compound the problem, each of these is dependent upon many different software/hardware elements of the cellular system. Together they utilize large segments of the cell site hardware/software as well as the switch hardware/software. In the case of Inter-System operations, the network between systems is also involved.

From the foregoing it is evident that whenever any of these system elements are upgraded or changed, there is a need for the Operating Company and the system Infrastructure Provider to verify that the changed system is able to provide the required QCR. This is a unique problem to CDMA systems, since they are necessarily reliant upon a smooth and effective meshing of all system elements so that the entire system operates in a manner which produces the required QCR. Also, it imposes a heavy burden on any test as well as maintenance system. For example, if a CDMA system is tested without loading the system with traffic, the coverage and quality may be verified but the capacity cannot. Conversely, if there is a test for capacity and quality but not for coverage, the coverage may not meet requirements. Since all three of these requirements are multivariate and interrelated and since all elements of the cellular hardware, in particular those in the CDMA system, must work well together, any change in any system element will impact the QCR and therefore the K-factor.

The limitations which have been discussed in the industry to date have been centered on the applicable theory, which is well known. For example, the maximum theoretical capacity is determined by the number of orthogonal Walsh (identifier) codes which are available in the system. In the present CDMA system, the maximum number of the Walsh codes is 64. However, of that number approximately seven codes must be used for other system functions. The reduced number of orthogonal codes at least theoretically indicates how much load or traffic can be carried, i.e., the capacity. However, it is also known that in actual system implementation the results are less. On the other hand it is not presently feasible to readily determine or predict how much less. Nor are there mechanisms available for quick and efficient determination of the overall effect of a change, so that the operation of the system is not perceptibly degraded.

Currently cellular operators make major system hardware/software changes late at night or early in the morning during minimum traffic hours. At that time the system is tested by making test calls and verifying that originations, terminations and hand-offs are working. In general, there is good assurance that if this works for 6–7 simultaneous calls, it will work when the system is under full load the following day. That is because coverage, quality and range are not interrelated within the system software/hardware.

However, in the case of IS-95 CDMA, verifying the performance of the system with a small number of phones located nearby the cell, or testing a phone or two in soft-handoff, fails to test the system under adequate load. Thus this test approach provides no assurance that the system will handle the normal system traffic nor does it assure any kind of system optimization. The result is that later in the day, when the peak loads occur, the system may severely degrade or even fail. In such a scenario the new software/hardware would have to be readjusted or replaced with the previous software/hardware during the peak load period, which is not advisable from an operational point of view. This approach would likely result in the system or some subset of cells becoming unavailable and perhaps produce a catastrophic failure. In the case where analog and CDMA systems co-exist in the same cell, it is possible that the analog service also would be affected and become unavailable.

In a different scenario of conventional testing, it is feasible to have 100–200 mobile unit operators make calls and travel within and between the cells and cell faces. However, this approach obviously involves significant expense and is very difficult to implement and duplicate to obtain satisfactory and unambiguous results.

Consequently, from the foregoing it can be seen that there is a critical need for a CDMA system testing and optimization procedure that is primarily effective, efficient, and of reasonably low cost. Further,the system and methodology should be subject to easy duplication and produce results which lend themselves to accurate comparison with the results of previous tests.

SUMMARY OF THE INVENTION

It is a primary object of the invention to provide a system and method of testing CDMA cellular systems which obviates all or most of the described problems of existing methodology.

In order to address such problems, it is an object of the invention to provide a system level traffic generator/simulator arrangement which will cause the traffic and load on the cell of interest and its neighboring cells to approach and exceed the normal peak loads on a single CDMA channel.

It is another object of the invention to provide a CDMA cellular test system and method which can be performed rapidly during low traffic hours, but which will adequately simulate the projected system peak traffic load that will likely be encountered on the next day or any typical day, whereby catastrophic failures can be averted.

The present invention provides a solution to the problem by supplying a system level traffic generator/simulator arrangement. Traffic is simulated by the generation of pseudotraffic which loads the cell of interest and its neighboring cells to an extent which approaches and exceeds the normal peak loads on a single CDMA channel. This is accomplished through the use of a plurality of load box test devices which are strategically placed. In a preferred embodiment there are load box test units placed centrally in the cell of interest and in various positions in the hand-off areas with adjacent cells. Load box test units are also placed or simulated in the fringe areas. In a typical test setup, according to the invention,approximately five to ten load box test units may be used.

Each load box includes multiple CDMA telephones, typically up to ten to twenty, where each automatically generates normal calls and repeats certain specific test sequences. It is desirable that the number of CDMA telephones in one load box test unit located at one site be limited to a number which is realistic as compared to actual conditions in the loaded network. The system generates voice sequences from both the simulated mobile and landline ends. It is important that actual voice signals be transmitted inasmuch as the system capacity is utilized only in the presence of the voice signal.

In the system of the invention, the signals transmitted from the load box test unit simulate multipath effects just as would occur with a truly mobile (moving) cellular telephone. Each of the cellular phones in the load box test unit preferably provides a mixture of uniform strength transmitted signals as well as signals of varying strength. Each of the CDMA telephones in a load box test unit is provided with a fading simulator and actuator. The phones provide transmitted signals that are both of fixed or constant power as well as signals of appropriately attenuated power. Therefore, some phones will transmit a signal which represents a near-by location some will simulate a signal from a further removed location.

As previously stated, multiple test units (5–10) are placed within the coverage area of the cell and its' neighbors. Some of these units are located in soft handoff zones, at least one in the cell center, and still others in fringe locations. Alternately, directional antennas may be used to allow a single location to be served by several different sites to simulate a soft handoff zone or a fringe location. In order to provide a realistic CDMA system simulation the power control function is exercised. To this end the load boxes are preferably dispersed over a wide area at various distances.

In carrying out an actual test, at least one mobile test unit is driven through the cell area to verify the performance of one or more calls. If the mobile test unit were to be used without the stationary load box test units, the result would be equivalent to having one call on the system, i.e., an unrealistically low load condition. The latter generally represents existing and conventional test procedures.

With the load box test units dispersed around the mobile test unit, it is possible to simulate sufficient traffic on the system to create a degree of loading simulating anticipated load conditions or any selected margin higher, such as 10–20%. It is then possible to drive through the test cell with the mobile test unit and verify the quality of the communications from and to the mobile unit. Appropriate data may be recorded so that the test may be utilized as a basis for comparison with subsequent tests.

The mobile test units which are presently available for use in conventional low traffic testing are suitable for use as the mobile unit in the test methodology of the invention. Such units are commercially available and may be obtained from Commarco Wireless, California and LCC Inc., Arlington, Va. The units are now used to simulate a single call as above stated. That approach constitutes the main focus of the industry at the current time.

The load box test unit arrangement of the invention is normally set up prior to a scheduled low traffic hour test, such as a test at say 2:00 AM. This initial test may be conducted with the CDMA system operating with its existing software/hardware system. The recorded results of this test are then used as a baseline. When new cell components are installed, or the CDMA system or its environment is otherwise modified, this baseline test result data may be used to verify that the modified system meets the previous baseline and that the new system can handle the normal peak loads in a satisfactory manner.

Although the system and method of the invention is very useful to verify the initial performance of an IS-95 CDMA cellular system, its larger scale benefit is realized over time. Thus, its repeated use as new or updated infrastructure software and hardware elements are introduced provides an engineering tool which is not presently available. Change in the cellular system is evolutionary and neverending. At the current time new system software and hardware are still being deployed even for US-AMPS analog systems. Also, as IS-95 CDMA systems become interconnected nationwide, all of the same concerns apply to the intersystem software/hardware elements and also to the interconnecting network.

CDMA based cellular systems represent a paradigm shift from the traditional approach to cellular systems. Larger bandwidth channels, frequency reuse of one, use of multipath to improve voice communications, soft hand-off, etc., are the more radical concepts used in CDMA which run counter to traditional methods applied to cellular telephony. CDMA as a technology is attractive to both operators and subscribers. Thus change in the systems is to be expected as the norm rather than the exception.

With the foregoing ends in view, the invention finds embodiment in certain combinations of elements, arrangements of parts and series of steps by which the objects aforementioned and certain other objects are hereinafter attained, all as more fully described with reference to the accompanying drawings and the scope of which is more particularly pointed out and indicated in the appended claims.

DESCRIPTION OF THE PREFERRED EMBODIMENT

Figure 1:
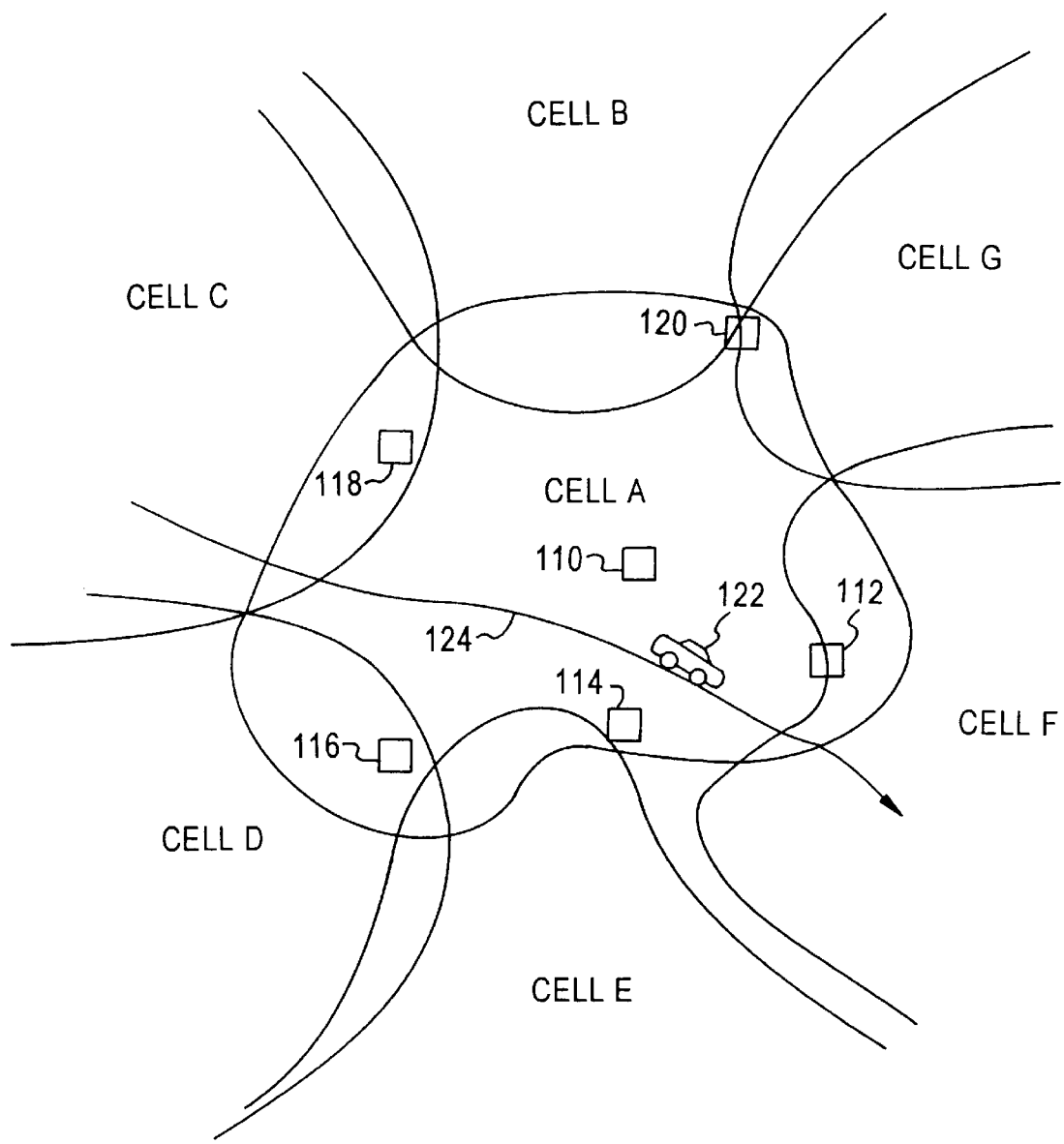
FIG. 1 shows a simplified plan view of the system architecture for a preferred embodiment of the invention and test setup implementation.

Referring to FIG. 1 there is shown a simplified representation of a CDMA cellular network. More particularly there is shown a depiction of a central cell A and its surrounding neighbor cells B–G. While hexagonal-shaped communication cells are usually depicted, it will be understood that such cells are artificial and do not exist in the real world. In the drawing cell A represents the cell under test pursuant to the method of the invention. As is customary, the surrounding cells overlap the central cell and the overlap areas constitute hand-off zones and possibly interference areas, thus influencing the ultimate system.

Two types of handoff are supported in CDMA, soft handoff and hard handoff. Hard handoff is the traditional handoff mode, as used in D-AMPS and GSM, where the mobile assists in the handoff process by taking measurement reports of neighboring channels and reporting them to the base station. In CDMA, hard handoff occurs between base stations having CDMA carriers with different frequency assignments. The hard handoff process for CDMA is similar to the handoff process of D-AMPS and GSM.

An advantageous feature of CDMA is that it predominantly uses a soft handoff procedure. Soft handoff occurs between base stations having CDMA carriers with identical frequency assignments. Soft handoff allows both the original cell and a new cell to temporarily serve the call during the soft handoff transition, i.e., it provides a make-before-break handoff which results in fewer dropped calls.

In the example of the invention shown in FIG. 1, load box test units are placed centrally in the cell of interest and in various positions in the hand-off areas with adjacent cells. These test units are shown at 110–120. It will be appreciated that these load box test units are representative and do not illustrate all of the units which are actually used. One or more load box test units will be dispersed or simulated in fringe locations.

As will be described in further detail, it is desired that a mobile test unit be driven through the test cell to perform a test. This is shown in FIG. 1 by the representation of a vehicle at 122 on a road 124 through the cell under test.

Figure 2:
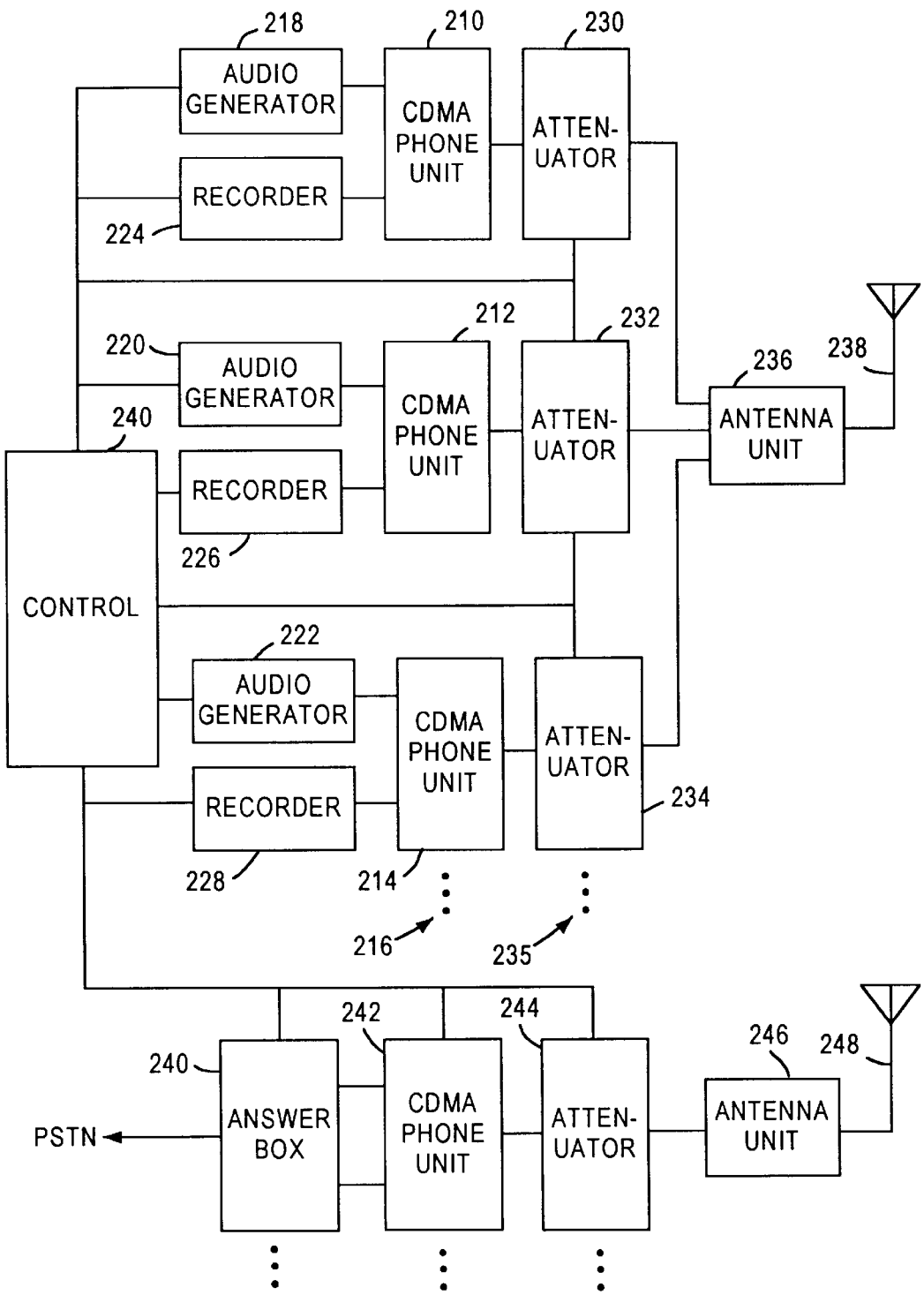
FIG. 2 shows a simplified block diagram of the architecture of a typical load box test unit for use in the system and method of the invention.

Referring to FIG. 2 there is shown a block diagram of the components which constitute a typical load box test unit. Each load box test unit includes a plurality of simulated CDMA cellular telephones which are here represented as units 210, 212, and 214. Additional units are represented by the dots 216. Typically a load box test unit may include from ten to twenty or more telephones.

The number of telephones in a load box test unit may vary from load box to load box to attempt to reproduce an accurate simulation of the generation of signals when the system is under varying loading conditions. It is not necessary that all telephone units in a load box transmit during the entirety of a particular test, however, this mode is also feasible and may be desirable under certain conditions. On the other hand, it is undesirable to utilize a co-located number of telephone units which would represent an unrealistic concentration of calls in actual practice.

Each cellular telephone 210–214 is provided with an audio input. To this end the telephones are provided with audio generators 218, 220, and 222. These audio generators may consist of audio recordings or micro-controller driven audio generators, including appropriate audio level control sequences, which are fed to the audio input line of the telephone. Each simulated CDMA cellular telephone 210–214 produces a received signal output and these are fed to audio detection and recording devices 224, 226, and 228.

The CDMA cellular telephones 210–212 are connected to variable attenuators 230, 232, and 234. The attenuators provide programmed attenuation which is both fixed and variable. The fixed attenuation may be used to simulate distance from the base station, while a fluctuating attenuation may be superimposed to simulate motion, fading, multipath signal variation, or the like.

The fluctuating attenuation also exercises the power control function. It will be appreciated that power control is critical to CDMA operation and system loading. If the power control fails or malfunctions, a single telephone is capable of virtually commandeering the full CDMA channel. If a cellular telephone powers up when it should be powering down the possible effect is forced dedication to one telephone call, such that other signals cannot be decoded. This reduces the network to a capacity of one, which represents a catastrophic CDMA system failure. The embodiment of the invention provides for ready and controllable testing of this critical feature.

The attenuators 230, 232, and 234 for the simulated telephones 210, 212, and 214 are connected to a combining antenna network 236. The combining network is connected to an antenna 238. In this embodiment the same antenna serves all of the telephones. As an alternative separate antennas may be used.

Each load box testing unit contains a computer or processor or a micro-controller 240 to provide program control for its various components. The computers or processors may be centrally controlled by a control computer or server (not shown). Such a central control is advantageous to facilitate operator or technician manual input in order to effect changes to the test regime. This also permits load box downloading of test result data for central storage and analysis.

The operator preferably has multiple pre-established testing programs depending upon the parameters of operation which it is desired to investigate and/or simulate. A basic advantage of the system is its ability to duplicate tests for comparative purposes. Thus it is possible to obtain an accurate evaluation of the effect of changes in the software or hardware in the system under controllable degrees of load.

In addition to the equipment which has been described thus far, answering box test units are also provided in the load box test units. These may be separate from the load boxes or incorporated into the enclosure for the load box test units. It is the function of the answering box test units to answer incoming calls and provide a connection to the Public Switched Telephone Network (PSTN), in order to provide a test of that portion of the overall network. FIG. 2 shows such an answer box 240 connected to a simulated cellular telephone 242, attenuator 244, antenna unit 246, and antenna 248. Additional load box units may be provided as indicated by the dots. These are also provided in association with the landline test, a telephone terminal connected to the PSTN and an answering machine, or the like, associated with such terminal. Upon the landline terminal receiving a call from the mobile test unit the answering machine delivers a voice signal which may be recorded and analyzed at the mobile end.

The performance of a typical test using the system and method of the invention may be described as follows. The load box test units are placed in their predetermined positions in and on the borders of the cell to be tested as shown in FIG. 1. At least one load box test unit is placed at the center of the cell and other load units are placed in the handoff areas as indicated in FIG. 1. A minimum number of load box test units used in a test would be seven. Pursuant to prior programming, some but not all of the approximately 10–20 cellular telephone units (cellular telephones and connected equipment) in each load box test unit will be activated. At least one answer box is typically activated in each load box testing unit.

Upon activation, the pre-programmed control computers commence running a program to cause the cellular telephones and related attenuators to broadcast signals pursuant to regimes established to simulate as closely as possible a CDMA cellular network which is loaded to a typical anticipated day-time traffic capacity. This traffic load is predetermined and may vary during the test pursuant to the program. It is a feature of the invention that the nature and number of signals generated by the load box test units may be varied, even to the point of loading the network to a degree at which the voice signals become unuseable. This is a true extreme CDMA system capacity condition.

The individual cellular telephones preferably do not perform identical routines. The cellular telephones produce voice signals continuously in some cases and intermittently in others. The script produced by each telephone will be as pre-recorded or programmed in its audio generating device. The stationary units may also be programmed to place as well as receive calls. Thus the background traffic may include calls placed and answered from stationary unit to stationary unit, as well as calls between the stationary units and the mobile unit. This provides a traffic background of real voice signals which accurately reproduces a true traffic condition. It is not pseudo-simulation as occurs with current "noise" generators. Other audio test sequences are also envisioned.

Between voice transmissions the telephones will be in a receive mode. Any calls which are received will be recorded on the associated recording unit. The answer boxes will deliver signals from any received calls to the Public Switched Telephone Network (PSTN). PSTN terminals are provided to receive these calls, to respond with recorded voice messages and to record the details of all such received calls. The answer boxes and their associated landline terminals may also be programmed to initiate calls.

It is to be understood that while the drawing shows a PSTN connection solely to an answer box, such connections may also be provided to one or more of the stationary load box test units.

The vehicle carrying the mobile test unit will travel its pre-determined route. During its progress the mobile test unit places one or more calls to its own answer box(es). The mobile test unit may place a single sequence of calls or may place multiple simultaneous calls or sequences of calls. The calls are placed to predetermined answer boxes to test different conditions expected to exist at different positions of test units. The duration of the test is not unduly time consuming and will ordinarily be approximately 15–20 minutes, however its timing is not critical. The test typically occurs during a low network traffic condition, i.e. off-peak hours, which will usually coincide with occurrence of low vehicular traffic. The recorder, associated with the mobile test device, records all pertinent data regarding the calls and provides call history for analyses, comparison and archiving purposes.

In addition to the data recorded by the mobile test unit, the cellular switch and one or more PSTN switches may collect and record data regarding the calls received. This permits checking dropped calls and other difficulties which may be encountered in call handling.

The mobile test unit preferably includes a GPS (Global Positioning System) unit whereby the position of the vehicle at all times during the test may be accurately determined and recorded. This enables location of particular terrain or other environmental situations which may be causing problems. Multiple test vehicles and plural routes may be utilized.

Following completion of the test the test data is collected, analyzed and stored. The vehicle operators preferably monitor the calls during the transit mode and can form an instantaneous preliminary opinion as to whether serious problems exist and/or whether the test itself is conducted in a satisfactory manner. The gathered data and the conclusions drawn by the vehicle operator or operators may then be used to determine whether or not there are immediate problems which demand attention. The data may also be used on a long term basis as a base line for comparison when changes to the system are made. Changes which may be reflected in periodic tests may be caused by events other than changes in the network hardware or software. Thus the location of obstacles which modify the effective terrain and therefore affect propagation may be expected to produce some change in the performance of the system.

The analysis of the initial test provides valuable information as to the current functioning of the CDMA cellular system. However, the long time benefit of the system and method of the invention lies in its providing bench marks against which to make comparisons as time passes and conditions change. The testing procedure involves virtually the entirety of the CDMA cellular network functions so that a comprehensive picture can be obtained and the system optimization performed. For example, the up-links and down-links in a CDMA cellular system each utilize different modulation schemes and carry different signal content. The down-link channels consist of broadcast channels used for control as well as traffic channels to carry user information. The pilot, sync, and paging channels are included in the broadcast channels. The up-link channel is composed of access channels and uplink traffic channels. These channels share the same CDMA frequency assignment using direct sequence CDMA techniques, as mandated by the IS-95 standard.

It is important that both the downlink and the uplink channels are operating satisfactorily and that they be separately tested. That requirement is satisfied using the above described test configuration and method of operation where both ends of test calls are monitored and produce recordings and data records. In a similar manner it is important that power control be adequately exercised and monitored during the test. This too is accomplished according to the invention by the placement of the load box test units and by the variable and fixed attenuation which is utilized.

While the performance of a test has been described in terms of a traverse of the test cell with a mobile test device, it is to be understood that a test may comprise a sequential series of traverses. Thus the cell may be traversed under a first loading scenario followed by one or more additional traverses under different loading scenarios. All such traverse data is collected and the control programs are archived so that any one test or sequence of tests may be accurately duplicated for later comparison with the results of later tests.

While the foregoing has described what is considered to be preferred embodiments of the invention, it is understood that various configuration modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of load testing a Code Division Multiple Access (CDMA) cellular communication system for the purpose of system optimization, comprising the steps of:
   a) generating CDMA cellular transceiver calls to or from multiple stationary sites within a cell of a CDMA cellular communication system, wherein the generating of the cellular calls includes transmission of predetermined signals including CDMA encoded voice signals or CDMA encoded audio sequences from the stationary sites, said cellular calls simulating a traffic loaded condition of said CDMA cellular communication system;
   b) traversing a predetermined path through said cell with a mobile test unit while making with said mobile test unit at least one telephone call to at least one of said sites; and
   c) recording data representative of parameters of said at least one telephone call made with the mobile test unit during said traverse.

2. A method according to claim 1 including the steps of modifying conditions in said cellular communication system, repeating said test, and comparing the recorded data obtained in the tests.

3. A method according to claim 2 wherein at least a portion of said data is recorded at one of said sites.

4. A method according to claim 3 including the steps of repeating said test, and comparing the recorded data obtained in the tests.

5. A method according to claim 4 including the step of modifying at least certain conditions in said cellular communication system between said tests.

6. A method according to claim 1 wherein at least a portion of said data is recorded at said mobile test unit.

7. A method according to claim 1 wherein said at least one telephone call simulates a mobile CDMA transceiver to mobile CDMA transceiver telephone call.

8. A method of load testing a Code Division Multiple Access (CDMA) cellular communication system, comprising the steps of:
   a) generating CDMA cellular transceiver calls to or from multiple sites within a cell of a CDMA cellular communication system, the calls including transmission of a plurality of predetermined signals including CDMA encoded voice signals from the sites;
   b) varying the effective transmitted power of the CDMA encoded voice signals transmitted from the sites within the cell in a predetermined pattern;
   c) traversing a predetermined path through said cell with a mobile test unit while making with said mobile test unit at least one telephone call to at least one of said sites; and
   d) recording data regarding said at least one telephone call made with the mobile test unit during said traverse.

9. A method according to claim 8 including the step of making at least one telephone call from said mobile test unit to a terminal connected to a Public Switched Telephone Network (PSTN).

10. A method according to claim 8 wherein said predetermined pattern for varying said effective transmitted power includes a fixed component with a variable component superimposed thereon.

11. A method according to claim 8 wherein at least a portion of said data is recorded at said mobile test unit.

12. A method according to claim 11 wherein at least a portion of said data is recorded at one of said sites.

13. A method according to claim 12 including the steps of repeating said test, and comparing the recorded data obtained in the tests.

14. A method according to claim 13 including the step of modifying at least certain conditions in said cellular communication system between said tests.

15. A method according to claim 8 wherein said at least one telephone call simulates a mobile CDMA transceiver to mobile CDMA transceiver telephone call.

16. A method according to claim 8 wherein said transmissions from said multiple sites are program controlled.

17. A method according to claim 8 wherein at least one of said multiple sites is substantially at the center of said cell.

18. A method according to claim 17 wherein a plurality of said multiple sites are within soft handoff zones of said cell.

19. A method according to claim 18 wherein at least one of said multiple sites is within a hard handoff zone of said cell.

20. A system for load testing a Code Division Multiple Access (CDMA) cellular communication system comprising:
   a) a plurality of stationary test units including CDMA transmitters and receivers disposed within the periphery of a cell in said CDMA cellular communication system, said stationary test units making or receiving CDMA cellular calls, including transmitting predetermined signals including CDMA encoded voice signals or CDMA encoded audio sequences;

b) a mobile test unit traversing a predetermined path through said cell while making at least one CDMA telephone call to at least one of said stationary test units; and c) a data recording device recording data regarding said telephone call at said mobile test unit.

21. A system according to claim 20 wherein said stationary test units and their transmissions are program controlled.

22. A system according to claim 20 including a landline terminal to which said mobile test unit makes a telephone call.

23. A system according to claim 22 including a stationary answer test unit receiving a CDMA call from said mobile test unit, said stationary answer test unit being connected to said landline terminal via a Public Switched Telephone Network (PSTN).

24. A system according to claim 20 wherein said stationary test units include attenuating devices causing the effective power of said signals transmitted by said stationary test units to vary in a predetermined pattern.

25. A system according to claim 24 wherein said attenuating devices are program controlled.

26. A system according to claim 20 wherein at least one of said stationary test units is located substantially at the center of said cell.

27. A system according to claim 26 wherein at least a plurality of said stationary test units are located in soft handoff zones of said cell.

28. A system according to claim 20 including data recording devices recording data regarding said telephone call at a stationary test unit.

29. A system for testing a Code Division Multiple Access (CDMA) cellular communication system comprising:

a) a plurality of stationary test units including CDMA transmitters and receivers disposed within a cell in said cellular communication system, for making CDMA cellular calls through said cellular communication system, and as part of each call transmitting CDMA signals including voice signals or audio sequences;

b) said stationary test units including program controlled attenuators varying the effective transmitted power of said transmitted signals;

c) at least one of said stationary test units including a data recording device recording data related to at least one call received by said stationary test unit;

d) a mobile test unit traversing a predetermined path through said cell while making at least one CDMA telephone call to said at least one of said stationary test units; and e) a data recording device recording data regarding said telephone call at said mobile test unit.

30. A system according to claim 29 wherein at least one of said stationary test units is located substantially at the center of said cell.

31. A system according to claim 30 wherein at least a plurality of said stationary test units are located in soft handoff zones of said cell.

32. A system according to claim 30 wherein a plurality of said stationary test units include plural transmitters and receivers.

33. A system according to claim 32 wherein said plural transmitters transmit substantially simultaneously.

34. A system according to claim 29 wherein one of said stationary test units makes a telephone call to another of said stationary test units during the traverse of said mobile test unit.

35. A system for load testing a Code Division Multiple Access (CDMA) cellular communication system, comprising:

a) a plurality of stationary test units disposed for operation within a cell of the CDMA system, each stationary test unit comprising a plurality of CDMA transceivers for making or receiving cellular calls, at least one audio signal source coupled to each of the CDMA transceivers for supplying voice signals or audio sequences to the transceivers for CDMA encoded transmission thereof during the cellular calls;

b) a mobile test unit traversing a predetermined path through said cell while making at least one CDMA telephone call to at least one of said stationary test units; and c) a data recording device recording data regarding said telephone call at said mobile test unit.

* * * * *